Figure 1:
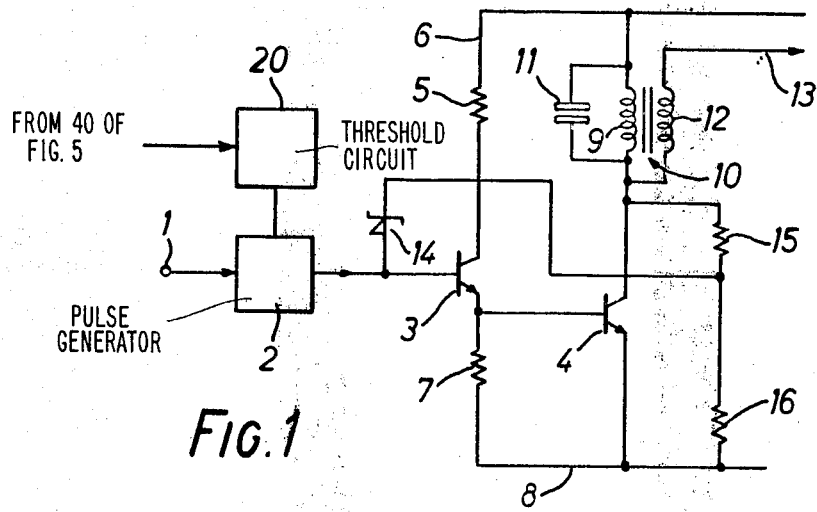

United States Patent [19]

Fowler

[11] 4,000,724
[45] Jan. 4, 1977

[54] IGNITION ARRANGEMENTS FOR INTERNAL COMBUSTION ENGINES

[75] Inventor: Albert Lewis Fowler, Kirkcaldy, Scotland

[73] Assignee: Hughes Microelectronics Limited, Culver City, Calif.

[22] Filed: July 15, 1974

[21] Appl. No.: 488,411

[30] Foreign Application Priority Data

July 14, 1973 United Kingdom ............. 33667/73

[52] U.S. Cl. ...................... 123/117 R; 123/148 E; 123/148 CB
[51] Int. Cl.[2] ......................................... F02P 1/00
[58] Field of Search ..... 123/148 E, 148 OC, 117 R

[56] References Cited

UNITED STATES PATENTS

| | | | |
|---|---|---|---|
| 3,454,871 | 7/1969 | Nolting | 123/148 E |
| 3,636,936 | 1/1972 | Schuette et al. | 123/148 OC |
| 3,689,753 | 9/1972 | Williams et al. | 123/117 R |
| 3,696,303 | 10/1972 | Hartig | 328/55 |
| 3,738,339 | 6/1973 | Huntzinger et al. | 123/148 E |
| 3,749,073 | 7/1973 | Asplund | 123/148 E |
| 3,832,986 | 9/1974 | Dogadko | 123/148 E |
| 3,853,103 | 12/1974 | Wahl et al. | 123/117 R |
| 3,874,351 | 4/1975 | Asler et al. | 123/117 R |
| 3,890,944 | 6/1975 | Werner et al. | 123/117 R |
| 3,898,894 | 8/1975 | Aono et al. | 123/117 R |
| 3,921,610 | 11/1975 | Hartig | 123/117 R |
| 3,939,811 | 2/1976 | Sasayama | 123/117 R |
| 3,942,491 | 3/1976 | Seite et al. | 123/117 R |

Primary Examiner—Charles J. Myhre
Assistant Examiner—Paul Devinsky
Attorney, Agent, or Firm—Lawrence V. Link, Jr.; W. H. MacAllister

[57] ABSTRACT

An ignition system for an internal combustion engine which includes circuitry for generating a pulse of a duration which is substantially independent of engine speed within at least a predetermined speed range. Means are provided for varying the timing of said pulse at least in response to engine speed (and, in the preferred embodiment described, to load as measured by manifold vacuum) so that the end of the pulse occurs at the required angle in the engine cycle, in accordance with engine speed and possibly other inputs.

In the preferred embodiment described, a read only memory stores engine angle signals which are converted into an appropriate delay by means of a programmed delay line.

Means are also provided in the pulse generation circuit for protecting the components thereof from high overswing voltages.

6 Claims, 6 Drawing Figures

IGNITION ARRANGEMENTS FOR INTERNAL COMBUSTION ENGINES

The present invention relates to ignition arrangements for internal combustion engines. It relates more especially to such an arrangement in which high voltage pulses are produced from the secondary winding of an ignition coil in response to interruptions of current flowing in the primary winding of the coil. The high voltage pulses are fed, in a predetermined sequence, to sparking plugs provided in respective cylinders of the engine so as to produce sparks which initiate the internal combustion process that provides the energy to motivate the engine.

Conventional contact breaker circuits have the disadvantage that at low engine speeds the contacts remain closed (i.e. so that current flows through the primary winding of the ignition coil) for relatively long periods, whereas at high engine speeds these periods are reduced so substantially that there is insufficient time for an appropriate amount of current to build up in the primary coil. This, in turn, causes the high voltage pulses produced at the secondary winding of the coil to be reduced in amplitude as compared with pulses produced at low engine speeds. The reduction in amplitude can be such as to cause erratic firing.

Also, in order to maintain optimum engine performance it is desirable to adjust the timing of the interruptions of the primary current relative to the positions of the cylinders in accordance with engine speed and possibly other factors such as the load applied to the engine.

It is an object of this invention to provide an improved ignition system for internal combustion engines in which ignition occurs at an angle in the engine cycle dependent on the engine speed, and in which the time for which current flows through the primary winding of the ignition coil is substantially independent of engine speed, at least over a predetermined speed range.

According to the invention there is provided an ignition system for an internal combustion engine having a voltage generator for producing ignition, comprising means for generating a pulse of a duration which is substantially independent of engine speed within at least a predetermined speed range, means for utilising the beginning and end of said pulse to initiate charging and discharging of said generator, the generator generating a voltage for producing ignition on discharge, and means for varying the timing of the beginning of said pulse in response to at least engine speed so that the end of said pulse occurs at an angle in the engine cycle selected according to said speed.

Suitably, the generator is charged by direct current derived from a battery carried by the vehicle to which the engine is fitted and means are provided for monitoring the voltage of said battery and for responding to the monitored voltage to extend the pulse duration so that the said voltage can be maintained at substantially constant amplitude despite variations in the voltage provided by the battery under varying conditions such as the extreme load imposed thereon when the engine is started.

Conveniently, the means for generating said voltage comprises a coil having a primary winding which is traversed by said direct current; the voltage being generated in the secondary winding of the coil in response to interruptions of said current caused by switching a semiconductor device, such as a transistor, the emitter-collector path of which is disposed in series with said primary winding. In this event, the object of the invention can be achieved by supplying said semiconductor device with pulses adapted to switch it "on" (i.e. to enable it to pass the current) and "off" alternately, the pulses being timed such that all of the periods for which the device is turned "on" are of substantially the same duration irrespective of the speed of operation of the engine during normal running conditions. In the event of a substantial reduction in the voltage of the battery which supplies said direct current, for example as may occur during starting of the engine, it is desirable for the length of said "on" periods to be extended so that sufficient current can build up in the primary winding of the coil to enable the voltage pulses produced by the secondary winding of the coil to exhibit an amplitude which approaches said substantially constant amplitude despite said reduction in voltage.

Figure 2:
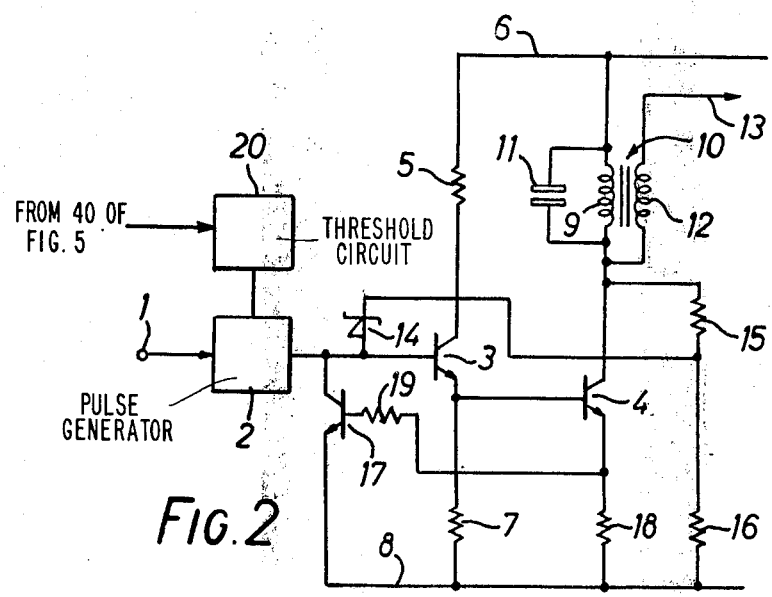
Figure 3:
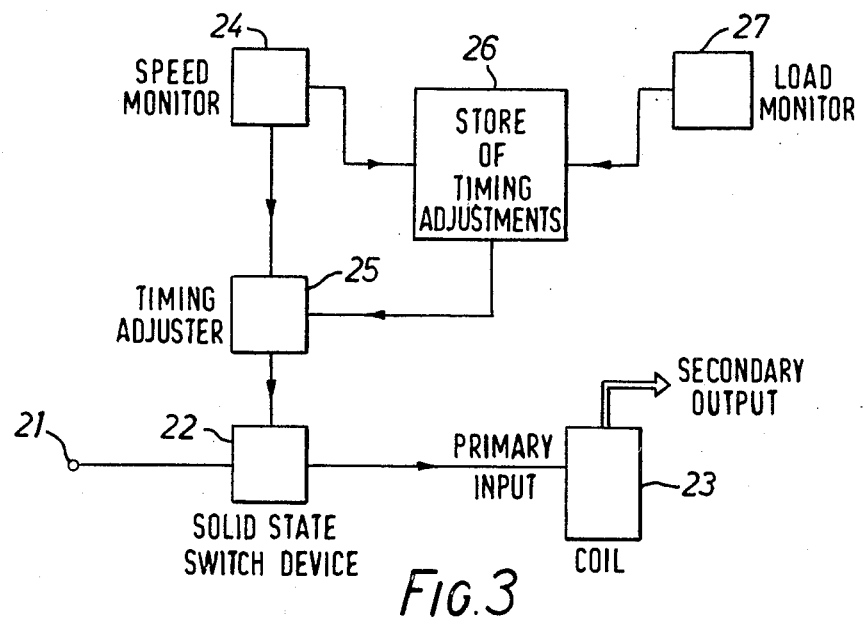
Figure 4A:
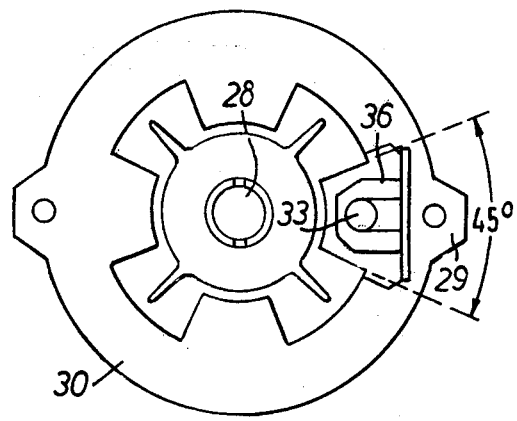
Figure 4B:
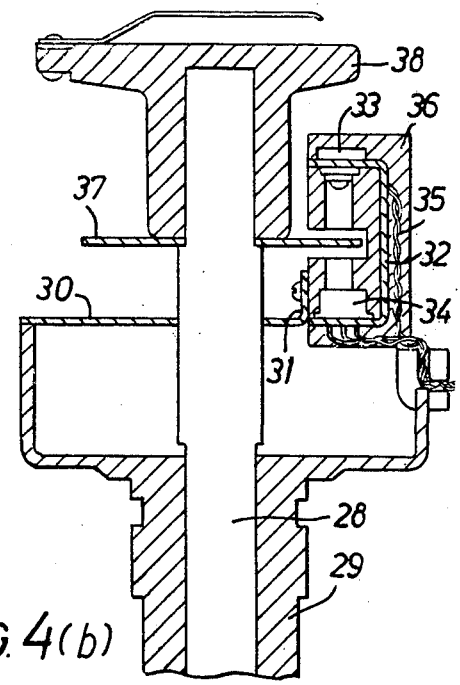
Figure 5:
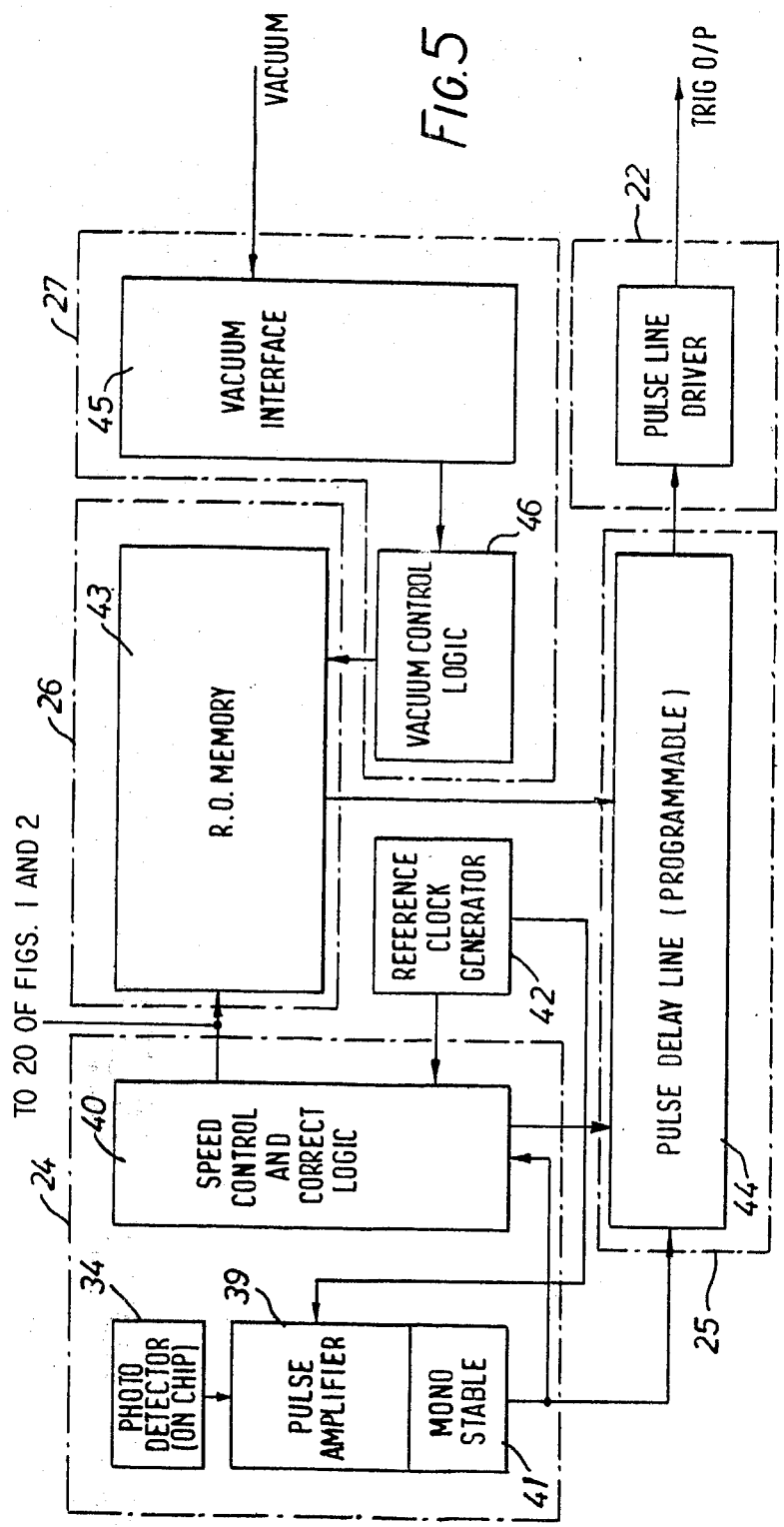

In order that the invention may be clearly understood and readily carried into effect, it will now be described, by way of example only, with reference to the accompanying drawings of which :

FIG. 1 shows part of an arrangement in accordance with one example of the invention, FIG. 2 shows a modification of the part of the arrangement shown in FIG. 1, FIG. 3 shows in simplified form a block diagram of a pulse generator used in the system shown in FIGS. 1 and 2, FIG. 4 shows part of the engine speed monitoring arrangement included in the system shown in FIG. 3, FIG. 4a representing a plan view and FIG. 4(b) representing a cross-sectional view, and FIG. 5 shows a more detailed block diagram of the pulse generator shown in FIG. 3.

Referring now to FIG. 1, input data relating to the speed of operation of the engine, and possible also to other parameters such as the load demand placed on the engine, is fed via an input terminal 1 to a pulse generating circuit arrangement 2 which is preferably provided as an integrated circuit. The pulses generated by the circuit 2 are applied to the base electrode of an N-P-N transistor 3 which is connected as an emitter follower and feeds the base electrode of a second N-P-N transistor 4.

The transistor 3 receives its operating potentials via a collector resistor 5 from the positive voltage line 6 and via an emitter resistor 7 from the earth line 8. The lines 6 and 8 are connected to respective terminals of a battery (not shown) which is carried by the vehicle.

The primary winding 9 of an ignition coil 10 of conventional design is connected in series with the collector-emitter path of the transistor 4 between the lines 6 and 8; the winding 9 being shunted by a capacitor 11. The secondary winding 12 of the coil 10 is connected via a high voltage line 13 to a distributor (not shown) of conventional kind and thence to the sparking plugs of the engine.

Also included in the arrangement of FIG. 1 are a zener diode 14, the anode of which is connnected to the base electrode of the transistor 3, and a pair of resistors 15 and 16 which, together with the winding 9, from a potential chain connected between the lines 6 and 8, the cathode of the zener diode 14 being connected to the junction of the resistors 15 and 16. The purpose of these three components will be explained more fully hereinafter.

In operation, the circuit arrangement 2 is arranged to produce driving pulses for the transistor 3, the timing of said pulses being adjusted in accordance with the prevailing timing requirements for the engine, the spark being produced at the required time by the off-going edge of the current pulse interrupting the current in the coil.

It will be appreciated that conventional contact breaker ignition circuits are such that, at low engine speeds, the contacts remain closed (i.e. so that current flow through the primary winding of the ignition coil) for relatively long periods, whereas at high engine speeds, these periods are reduced so substantially that there is insufficient time for an appropriate amount of current to build up in the primary coil. This, in turn, casuses the high voltage pulses produced at the secondary winding of the coil to be reduced in amplitude, as compared with the pulses produced at low engine speeds. The reduction in amplitude can be such as to cause errating firing of the engine.

In accordance with this invention, and in contradistinction to the conventional techniques, the pulses produced by the circuit arrangement 2 are arranged to be of substantially constant duration irrespective of engine speed. The foregoing description relates to pulses of such polarity (positive in this example) as to cause the transistor 3 and thus the transistor 4 to conduct. It will be appreciated that, as the engine speed varies, the gaps between successive positive pulses will vary, but this is of no consequence provided that the gaps do not reduce in time below, say a chosen, 3 milliseconds "on" period. This ensures that a four cylinder engine can operate up to 9,000 rpm, i.e. 3.3 milliseconds between sparks. A typical time for the delay between the cessation of current in the primary coil and the spark, due to various distributed circuit parameters, is around 20 to 50 microseconds. The integrated circuit makes an allowance for this delay by having the mean value programmed into its timing.

A suitable duration for the positive-going pulses from the circuit arrangements 2 is, as indicated, 3 milliseconds; this value being sufficiently long to enable the design value of primary coil current to be built up (assuming that the battery voltage remains reasonably stable during normal running). The period of 3 milliseconds is also sufficiently short to avoid excesive current dissipation at high speeds of operation.

The pulses of fixed duration can be achieved by using the input data to trigger a monostable circuit, the output of which feeds a threshold and shaping circuit.

As the spark is produced in response to the trailing edge of the fixed duration pulse, the leading edge must clearly be initiated in advance of the required spark time by a time equal to the fixed duration. The time at which the spark is to occur is determined by circuit 2 in accordance with the prevailing time requirements for the engine, and circuit 2 is also arranged to take account of the required charging period and to advance the timing of the leading edge of the pulse accordingly.

During engine starting, a battery which operates nominally at 12 volts can provide as little as five volts, and in these circumstances the 3 millisecond period mentioned previously may be insufficient to enable sufficient current to build up in the primary winding 9 to permit reliable firing. Thus in accordance with a feature of this invention, a voltage or r.p.m. sensing circuit 20 is rendered operative at start-up engine speeds below a threshold level — say 360 rpm — to sense the battery voltage or r.p.m. and, in the event of a predetermined low voltage or r.p.m. below a value of 360, to feed a signal to the circuit arrangement 2 which is effective to extend the duration of said positive going pulses by an amount which enables the said sufficient current to build up in the winding 9. Hence, pulse generator circuit 2 may include a monostable circuit which provides a pulse of a first duration in the absence of an enable signal from rpm sensing circuit 20 and which provides a pulse of an extended duration in response to an enable signal from circuit 20. Rpm circuit 20 may, for example, comprise any suitable threshold circuit which provides the enable signal when the rpm is less than the preselected value.

The function of the aforementioned components 14, 15 and 16 is to protect the transistor 4 from high overswing voltages which can develop in the primary winding 9. If the zener diode 14 is rated at the maximum safe value of collector voltage for transistor 4, e.g. 300 volts, then its cathode can be connected directly to the collector of transistor 4. On the other hand if, as shown in FIG. 1, a zener diode of lower voltage rating is used, then the configuration utilising resistors 15 and 16 is employed.

The modification which is shown in FIG. 2 enables the peak current passed through the primary winding 9 to be limited to a predetermined maximum value.

In the modified arrangement, the collector-emitter path of a third N-P-N transistor 17 is conneced between the base of transistor 3 and the earth line 8. A resistor 18 is connected between the emitter of transistor 4 and the earth line 8, and a current limiting resistor 19 is connected between the base of transistor 17 and the junction of transistor 4 and resistor 18.

In operation, when the emitter current of transistor 4 is high enough to permit the voltage across resistor 18 to exceed the "on" base-emitter voltage of transistor 17, base current flows into the transistor 17 via the resistor 19 and hence further input current to transistor 3 is shunted (via transistor 17) to earth line 8. Thus any further increase in the current flowing in the emitter circuit of transistor 4 is prevented. The limited value of emitter current and (provided the grain of transistor 4 is sufficiently high) also of the current through winding 9, is approximately given by Vbe/R18, where Vbe is the "on" base emitter voltage of transistor 17 and R18 is the resistance of resistor 18.

Referring now to FIG. 3, the ignition circuit shown in FIGS. 1 and 2 is denoted by reference 22. A primary current is arranged to flow from a battery (not shown) via a conventional ignition switch (not shown) to a terminal 21. The current flows via the ignition circuit 22 to the primary winding of an ignition coil 23. The primary current is interrupted by means of the device 22 at a rate dependent upon the speed of the engine with which the system is associated, thereby causing high voltage pulses to be induced in the secondary winding of the coil 23, the pulses being distributed in known manner to sparking plugs of which one is provided for each cylinder of the engine.

The device 22 is caused to interrupt the primary current $n$ times per engine revolution (where $n$ is the number of cylinders in the engine) by electrical pulses generated by a circuit 24 which is effective to monitor the engine speed. The pulses generated by the circuit 24 are passed to the device 22 via a timing adjustment circuit 25. The pulses are also applied as interrogating signals, to a read only memory store 26 which is conditioned to store a set of timing adjustment values, each value being appropriate to a particular engine condition as represented by the speed of the engine and the load applied to it. Interrogating signals indicative of the load applied to the engine are derived from an engine load monitoring circuit 27 which is coupled to the inlet manifold of the engine in such a way as to detect the vacuum existing therein.

The store 26 responds to the two interrogating signals from the circuits 24 and 27 to produce an output timing signal which corresponds to that one of the set of stored timing adjustment values which is appropriate to the prevailing conditions of the engine as monitored by the citcuits 24 and 27. The timing adjustment circuit 25 responds to the output timing signal to adjust the timing of the interruptions of the primary current relative to the absolute angular position of the crankshaft of the engine, so as to maintain optimum engine performance by causing the respective sparking plugs to produce sparks at the appropriate times before the respective pistons — which are carried by the crankshaft — reach the tops of their respective cylinders.

Part of the engine speed monitoring circuit 24 is shown in more detail in FIG. 4(a) and 4(b).

The speed monitoring circuit, or at least the active part thereof, is situated within the casing of the usual distributor. The casing may be reduced in size if desired. A shaft 28 is rotated at engine speed, in known manner, within a stationary housing part 29. The housing 29 supports an apertured, stationary plate 30 which terminates in a flange 31 to which is secured a support member 32. Member 32 supports a light emitting diode 33 and a photo-detector and amplifier 34, the member 32, diode 33 and detector 34, together with electrical cables 35 being encapsulated in a suitable medium 36. The medium 36 is such as to be resistant to the kinds of materials likely to be deposited thereon in its working environment.

The diode 33 and the detector 34 are spaced vertically from one another and a clear line of sight is provided from the diode 33 to the detector 34. This line of sight is interrupted $n$ times per revolution of the engine by means of a shutter disc 37 having $n$ blades, ($n$ being equal to four in this example) which is fixedly secured to the shaft 28. Also secured to the shaft 28, but disposed at the top thereof so as to be removable, is a rotor arm 38 of conventional kind. The retention of the rotor 38 enables the conventional technique to be employed for distributing the high voltage pulses derived from the coil to the sparking plugs. It will be appreciated, of course, that in the plan view of FIG. 4(a) the rotor 38 has been removed.

It will be realised that it is not necessary to mount the shutter on the rotor shaft of the distributor in the manner previously described. Such a shutter may for example be mounted upon the cam shaft of the engine or, as another example, it may be mounted upon the flywheel. In the event that the shutter is mounted upon the flywheel, it is provided with only half as many blades as a shutter mounted upon the rotor shaft of the distributor or upon the cam shaft, but the angular extent of the blades of a shutter upon the flywheel is twice that of the blades used in the other two cases. This is because the flywheel is arranged to rotate at twice the speed of the rotor shaft of the distributor or the cam shaft. In general, for an engine having four cylinders, a shutter having four blades, each of angular extent 45° separated by 45° spaces is employed when the shutter is mounted on the aforementioned rotor shaft or cam shaft, whereas a shutter having two blades each of angular extent 90°, separated by 90° spaces is employed when the shutter is secured to the flywheel. In either case, each change from light to dark (i.e. the onset of an interruption) is, in one example, used to identify the 102° before top dead centre (B.T.D.C.) position for a respective piston while each change from dark to light (i.e. cessation of an interruption) is used to identify the "static" 6° B.T.D.C. position for a respective piston.

The detector 34 is provided as part of an integrated circuit which is formed as a single M.O.S chip and performs most of the functions of the circuit shown in FIG. 3. FIG. 5 shows, in block schematic form, the various components which are provided on the chip. Where one or more of the components perform one of the functions described with reference to one of the blocks in FIG. 3, the the respective component or components are surrounded by a dashed outline which is labeled with the number of the relevant block in FIG. 3

The photo detector 34 consists of an M.O.S. transistor, the conductance of which is affected by the amount of light falling on the sensitive area. This device is connected to two separate circuits (not shown) in order to enable the system to discriminate between long term losses of light (due, for example, to deterioration of the diode or to an accumulation of dirt in the region between the diode 33 and the detector 34) and the relatively rapid interruptions of light due to the blades of the shutter disc 37. The first circuit has a long time constant and consists of an amplifier and a storage system for an open light (i.e. non-interrupted) reference level and the condition present on the photo transistor is transferred every micro-second to this circuit via a high impedance transfer device. This information is held and transferred to a pulse amplifer 39 to be used as a reference during the dark periods of operation (i.e. when a blade of the disc 37 lies between the diode 33 and the detector 34). The circuit therefore has a time constant of the order of seconds. The second circuit is a high speed sense circuit which detects when the amount of light falling on detector 34 changes from the amount falling thereon in the open light condition to 10% of this amount and then transfers an output signal to the pulse amplifier 39. The pulse amplifer 39 is used to amplify the signal derived from the said second circuit to a level suitable for feeding into the remainder of the logic system. The ouput of the pulse amplifer 39 is interrupted every micro second by a speed control logic circuit 40 and a pulse delay line input monostable 41.

The speed control and correction logic circuit 40 is used to calculate the engine revolution speed by measuring a time lag between two output signals from the aforementioned second circuit which is fed by the photo detector. This time duration is calculated with reference to clock pulses produced by an internal clock pulse generator 42. The number of clock pulses entered into a store in circuit 41 between the two successive output signals are fed into a read only memory store 43. The accuracy of the internal clock pulses is not critical, since errors due to this source are rendered self compensating.

Part of the speed control logic circuit 40 is also used to generate clock pulses for a variable delay line 44 which corresponds to the component 35 of FIG. 3 and which may take the form of a shift register. The actual length of this delay, represents a distributor angle of sixty degrees in increments of a quarter of a degree. The maximum delay of line 44 is thus equivalent to 240 bits, and the output of the read only memory 43 selects the number of bits delay to give the correct equivalent to the timing of the interruptions of the primary current. Since variation in the engine speed will result in the angular speed of shaft 28 altering, it is necessary to adjust the clock feeding delay line 44 synchronously with the engine speed, for example, by dividing the frequency of the reference clock generator 42 by the number of clock pulses entered into the store in circuit 41, this number being inversely proportional to engine speed. Therefore, part of the speed control logic is also part of the clock generator for the delay line. It is noted that alternate suitable means may be implemented to provide the output signals of speed control and correct logic circuit 40, for example arrangements in accordance with U.S. Pat. No. 3,767,902, issued Oct. 23, 1973, and entitled, "Engine Member Position Predictor" may be used.

As previously mentioned, in order that the timing of said interruptions can be adjusted so as to optimise the performance of the engine under different operating conditions, it is necessary to measure the engine load as well as its speed. This is achieve, in this example, by means of a suitable transducer which is coupled to the inlet manifold and produces movement of a mechanical member in response to the vacuum in said manifold. The mechanical member is effective to vary the frequency of oscillation of an oscillator so as to provide an electrical indication of said vacuum.

A variabe frequency square wave is thus derived from the oscillator, and this square wave is applied to a vacuum interface circuit 45, wherein the frequency of said square wave is compared with that of the pulses derived from generator 42. The result of this comparison is a vacuum control pulse which is applied to a vacuum control logic circuit 46. The output of the vacuum control logic is fed directly into the read only memory 43 to select the current delay for line 44. Details of the above summarized vacuum transducer arrangement may be found in U.S. patent application Ser. No. 487,635, filed July 11, 1974, entitled "Improvements in or Relating to Signal Combining Circuits" and assigned to the assignee of the subject application.

The read only memory 43 consists of a three plane programmable read only circuit which stores a set of values applicable to the delay of delay line 44 under various conditions of engine speed and load. The value selected from the memory 43 at a given time will depend on the input from the speed control circuit 40, the input from the vacuum control circuit 46 and any internal pre-stored conditions. For example, the input from the speed control circuit 40 may select a group of values each representing the angular delay required at that speed for a different engine load, and the input from the vacuum control circuit 46 may select the appropriate one of the group of values. The use of the memory 43 enables much more complex advance-retard curves to be incorporated than can be which with a conventional system. Since the output of the memory is 240 increments, each one equivalent to distributor angle of one quarter of a degree, the actual angle can be adjusted throughout the range to within a quarter of a degree, and with the automatic compensating of the speed control circuit applying to the delay line clock the trigger angle must be specified throughout the engine range to within a quarter of a degree.

As has already been mentioned, in order to obtain a charging period of fixed duration in the ignition circuit of FIG. 1, it is necessary for the trailing edge of the pulse from circuit 2 to occur at the correct fixing time and the leading edge to be advanced to the fixed period, say 3 ms. The required advance may be produced by suitably modifying the values stored in the read-only memory. For example, if the advance-retard curve specifies a delay of 30° at an engine speed S and an engine load L, and if 3 ms is equivalent to an angular rotation of 5° at speed S, then by storing a value corresponding to 25° instead of 30° in the read only memory, the required 3 ms advance is obtained automatically. The additional advance necessary when the charging period is increased under low battery voltage and low engine R.P.M. conditions, as previously described, may be achieved in the same way, i.e. by suitable modification of the stored values, or two different sets of values may be stored for low speeds, one set being selected when the battery voltage is normal, and the other set being selected when the battery voltage is low. The apparatus may be simplified if the values stored in the read-only memory are arranged to represent time delays instead of angular delays. The delay line would then be clocked at a constant, instead of at a speed dependent rate.

If the values stored in the read-only meory 43 represents the real angular delay, i.e. unmodified, other methods of obtaining the required advance may be used. For example, from the measurement of engine speed it is possible to calculate the interval between successive spark pulses at the speed in question. If, for example, the interval at a speed V is 5 ms and the required charging period is 3 ms all that is required is to produce the leading edge of the pulse from circuit 2 2ms after the trailing edge of the preceding pulse. The 2 ms delay may be produced in many ways, for example, by counting a predetermined number of pulses from the reference clock generator 42.

Another alternative would be to count pulses from the variable frequency clock generator in circuit 40 for a period of 3 ms. As the frequency is proportional to engine speed, the number of pulses counted represents the number of bits of delay time 44 which are equivalent to a delay of 3 ms at the engine speed in question. This number may then be substracted from the value derived from the read-only memory 43. The effect is to reduce by 3 ms the delay which would otherwise be selected by the value from the read-only memory, and therefore the advance by the required 3 ms the timing of the delayed pulse.

The invention is not limited to the particular embodiments described, and many modifications will be apparent to those skilled in the art. Any suitable methods of measuring engine speed and load may be used in place of the ones described. For example, the engine speed may be measured by using a piezo electric member compressed repeatedly by a cam rotated by the engine so that the member generates the required number of electrical impulses per revolution of the engine. The variable delay line may also take other forms. For example, the delay may be produced by storing the number value from the read only in a counter and counting back to zero in response to constant frequency clock pulses (when the stored value represents the time) or speed dependent clock pulses (when the stored values represent angle). The time taken to reach zero will then represent the required delay.

What I claim is:

1. An ignition system for an internal combustion engine having a voltage generator for producing a high ignition voltage on discharge comprising:

first means for generating a pulse of a duration which is substantially independent of engine speed within at least a predetermined speed range, second means for utilizing the beginnning and end of said pulse to initiate charging and discharging, respectively, of said generator; and third means for varying the timing of the beginning of said pulse in response to at least engine speed so that the end of said pulse occurs at an angle in the engine cycle selected according to said speed; said third means including a memory for storing signals representing different angles in the engine cycle as a function of at least engine speed, fourth means for selecting an angle signal from said memory in dependence on at least engine speed, and fifth means for converting the selected angle signal into the appropriate time delay from a reference time to the beginning of said pulse, said fifth means including a clocked time delay device, responsive to said angle signal, for providing the number of clock pulse intervals of delay which correspond to said angle signal, and sixth means for clocking said delay device at a frequency dependent on the engine speed.

2. A system according to claim 1 in which said third means includes means for responding to engine load as well as engine speed.

3. A system according to claim 1 further comprising: means for monitoring engine speed; and
means for lengthening the duration of said pulses for engine speeds below a predetermined value.

4. A system according to claim 3 in which said third means includes means for advancing the timing of the beginning of said pulses for engine speeds below said preselected value by an amount corresponding to the increase in the duration of said pulses.

5. A system according to claim 1 in which said means for generating a pulse is a transitorized circuit comprising a control transistor and a zener diode limiting the maximum voltage developed across said control transistor.

6. A system according to claim 1 in which said time delay device comprises a multi-bit delay line.

* * * * *